United States Patent
Pavlicevic et al.

(10) Patent No.: US 6,249,538 B1
(45) Date of Patent: Jun. 19, 2001

(54) COOLING DEVICE WITH PANELS FOR ELECTRIC ARC FURNACE

(75) Inventors: Milorad Pavlicevic, Udine; Alfredo Poloni, Fogliano di Redipuglia, both of (IT); Peter Tishchenko, Donezk (UA); Angelico Della Negra, Povoletto (IT)

(73) Assignee: Danieli & C. Officine Meccaniche, Buttrio (IT)

( * ) Notice: Subject to any disclaimer, the term of this patent is extended or adjusted under 35 U.S.C. 154(b) by 0 days.

(21) Appl. No.: 09/508,273

(22) PCT Filed: Sep. 3, 1998

(86) PCT No.: PCT/IB98/01371

§ 371 Date: Apr. 28, 2000

§ 102(e) Date: Apr. 28, 2000

(87) PCT Pub. No.: WO99/13281

PCT Pub. Date: Mar. 18, 1999

(30) Foreign Application Priority Data

Sep. 10, 1997 (IT) ............................................. GO97A0018

(51) Int. Cl.⁷ ....................................................... F27D 1/12
(52) U.S. Cl. ................................................ 373/76; 373/71
(58) Field of Search ................................... 373/2, 60, 71, 373/72, 73, 74, 75, 76; 432/238, 248; 266/193

(56) References Cited

U.S. PATENT DOCUMENTS

| 2,752,410 | 6/1956 | Olsson. | |
|---|---|---|---|
| 3,963,223 | * 6/1976 | Eysn | 373/76 |
| 5,241,559 | * 8/1993 | Hixenbaugh | 373/74 |
| 5,743,729 | * 4/1998 | Pavlicevic et al. | 373/76 |
| 5,772,430 | * 6/1998 | Pavlicevic et al. | 432/238 |

FOREIGN PATENT DOCUMENTS

| 2928964 | 1/1981 | (DE). |
| 0790473 | 8/1997 | (EP). |
| 2468863 | 5/1981 | (FR). |
| 2006410 | 5/1979 | (GB). |
| 2170890 | 8/1986 | (GB). |

* cited by examiner

Primary Examiner—Tu Ba Hoang
(74) Attorney, Agent, or Firm—Stevens, Davis, Miller & Mosher, LLP

(57) ABSTRACT

Cooling device with panels for electric arc furnaces, employed in an electric furnace in cooperation with the vertical sidewall located above the lower shell (11) of the furnace and/or with the roof (18), the furnace comprising a lower shell (11) to contain the bath of liquid metal (12) and an overhead upper shell defined by a plurality of panels (16) consisting of cooling tubes (17), the upper shell being covered by the roof (18), the lower shell (11) including a containing element (15) made of metal on the outer part, the internal refractory including an upper edge (11a) located approximately at the upper line of the layer of slag (14) present above the bath of molten metal (12), each panel (16) including an outer layer (19a), an intermediate layer (19b) and at least an inner layer (19c) of cooling tubes (17), the layers developing vertically along the vertical sidewall of the furnace above the refractory edge of the lower shell (11), the cooling tubes (17), the layers developing vertically along the vertical sidewall of the furnace above the refractory edge of the lower shell (11), the cooling tubes (17) of each layer (19a, 19b, 19c) being progressively and increasingly distanced from each other from the outside of the furnace towards the inside so as to define fissures and spaces of a progressively increasing size whereon the slag attaches itself.

19 Claims, 3 Drawing Sheets

COOLING DEVICE WITH PANELS FOR ELECTRIC ARC FURNACE

FIELD OF THE INVENTION

This invention concerns an electric arc furnace with a cooling device with panels as set forth in the main claim.

The cooling device with panels is applied in cooperation with the sidewalls and upper walls and with the roof of the electric arc furnace.

BACKGROUND OF THE INVENTION

The state of the art includes the structure of electric furnaces, particularly electric arc furnaces, which comprise a refractory lower shell, incorporating the hearth, above which there is the upper shell which functions as a sidewall where the cooling panels are positioned. Such furnaces also include a cover consisting of a roof which is also cooled.

In the state of the art, the sidewall of the furnace is defined by a row of these panels arranged substantially in correspondence with the outer edge of the lower shell; this situation makes possible the at least partial formation of a layer of slag, which attaches itself on the front part of the panels. However, this layer of slag is not normally enough to protect the refractory material from the thermal and chemical stresses which can be found in electric arc furnaces which are currently used.

This layer of slag has an insulating function so as to reduce the flow of heat and therefore to preserve the cooling panels from premature wear.

These solutions as are known in the state of the art, however, are not very effective since the slag attaches itself with difficulty to the inner face of the panels and cannot form a uniform and compact layer suitable to perform the function of thermal insulation.

Moreover, it is known that one of the greatest shortcomings in a furnace, as the melting cycle proceeds, is the wear and progressive erosion of the refractory material of the lower shell in the area at the level of the upper edge of the slag, that is to say, substantially at the upper circular strip of the lower shell. In this area, the combination of the temperature and the violent chemical reactions causes a high level of erosion which progressively damages the structure of the refractory material.

This forces the workers to intervene between one cycle and another so as to restore the correct conditions of efficiency of the refractory and thus obviate the risk of break-outs which are dangerous for the personnel.

Moreover, with this type of panel the heat flow directed towards the outside of the furnace is very great and a great deal of energy is lost. This is due to the great extent of the surface on which the heat exchange takes place, since the tubes forming these panels are adjacent to each other and cover the whole lateral surface of the furnace in the area where there is no refractory material.

Other shortcomings of structures including cooling panels as are known in the state of the art are that they have low resistance and are very dangerous to use.

The low resistance is caused on the one hand by the fact that only a very thin layer of slag attaches itself to the panels, and this is not sufficient to preserve the panels from the risk of breaking; and on the other hand by the great number of welds, each of which constitutes a critical point in the panels.

Moreover, the close formation of the rows of tubes and the fact that they are rigidly constrained to each other causes further thermo-mechanical stresses on the tubes, which in the long term leads to deformations and breakages caused by fatigue.

The panel structures are dangerous to use because, due to the rigid construction of the panels and the great number of welds, the tubes are subject to breakages and there is therefore a danger of water leaking out.

GB-A-2.270.146 shows an electric furnace with lateral cooling panels located above the lower shell and with cooling tubes which act on the refractory zone of the lower shell.

DE-C-4223109 shows panels with a plurality of horizontal mono-tubes arranged in two parallel rows and separated at regular intervals.

EP-A-0699885 shows a cooling system for the upper edge of the refractory part of the furnace.

This system includes U-shaped cooled tubes with the vertical tubes facing towards the bath of liquid metal.

This embodiment entails a variety of problems, on the one hand because the continuous tubes become unusable in the event of a breakage, and on the other hand because they are easily subject to perforations, since they face the bath of liquid metal.

However, if these tubes were to be protected, they would no longer have their desired effect.

In European patent application EP-A-790473, the present applicant describes a cooling device with panels for electric arc furnaces wherein, according to a first feature, there is a horizontal row of cooling tubes arranged slightly above a substantial part of the edge, or upper shoulder, of the refractory part of the lower shell and, according to another feature, there are two layers of cooling tubes, one inner and one outer, connected to each other in a rigid manner, and the pitch of the inner layer of tubes is less than that of the outer layer, in order to define spaces whereon the slag attaches itself.

This solution, although it has shown itself to be extremely satisfactory, has not completely solved all the problems and, in practice, has shown that it can be made even better, in terms of cooling efficiency, reduced energy loss, greater resistance of the tubes, lower costs, fewer risks during use, and a greater maintenance capacity.

FR-A-2.486.863 does not solve any of the above-mentioned problems, as there are no spaces whatsoever between the tubes which would allow a thick, consistent layer of slag to form.

The present applicants have designed, tested and embodied this invention in order to embody these operating improvements, and also to achieve further advantages as will be shown hereinafter.

SUMMARY OF THE INVENTION

The purpose of the invention is to achieve a cooling device with panels which enables the insulation properties of the layer of slag to be exploited in the most efficient manner, thus preserving the panels from progressive consumption and wear and therefore greatly increasing their working life and efficiency.

A further purpose of the invention is to achieve a cooling device with panels for electric arc furnaces which will greatly reduce the progressive wear of the refractory material at the upper circular strip of the lower shell.

Yet another purpose of the invention is to obtain a cooling device in which the welds are reduced to a minimum and thus the critical points along the hydraulic circuit are also reduced to a minimum; therefore, the possibility of break-downs and cracking of the device is reduced, which thus increases the resistance of the panels to the thermo-mechanical stresses which occur during the functioning of the furnace.

According to the invention, the cooling device comprises at least three substantially concentric levels or layers of cooling tubes, arranged one in front of the other and organised as panels, each one covering a circular sector of the furnace.

The distance, or pitch, between the rows of these levels or layers of tubes, in the direction of the vertical section of the furnace, increases as the rows go from the outside towards the inside of the furnace.

More specifically, the tubes of the outer layer are closer to each other so as to make a substantially continuous wall; the tubes of the intermediate layer are farther apart with the rows of tubes at a greater distance from each other; and the tubes of the inner layer are even farther apart so as to define wide spaces between the superimposed rows of tubes.

According to a variant, the tubes of the outer layer are not in contact but are separated by fissures.

In one embodiment, for every row of the inner layer there are two rows of the intermediate layer and for every row of the intermediate layer there are two rows of the outer layer.

According to a variant, outside the outer layer there is a continuous wall which acts as a containing and supporting cover for the panels of cooling tubes.

According to another variant, the inner layer of tubes is sloping, along the height of the furnace, with respect to the other two layers.

According to a further variant, this inclination of the inner layer affects only the lower part thereof.

The wide fissures and spaces between the tubes of the inner layer and the intermediate layer allow the slag to deposit in a thick layer, which protects and insulates the tubes thermally, increases their resistance and preserves them from the thermo-mechanical stresses and from the corrosive effects caused by the chemical reactions which occur inside the furnace.

In fact, the slag, powders and fragments which develop inside the furnace during the melting of the metal all deposit on the tubes because there are these fissures and spaces.

As they cool, the powders and slag solidify and become attached to the tubes, forming a single, insulating layer of great thickness.

Thanks to the insulating layer of slag, the layer of tubes which most contributes to the heat exchange with the inner area of the furnace is the inner layer, while the intermediate and outer layers are at least partly heat insulated from the working area of the furnace, and are thus protected and preserved from progressive wear.

This configuration of the panels also ensures a smaller energy loss, inasmuch as the layer most affected by heat exchange with the working area of the furnace is the inner layer, where the density of tubes is least.

Moreover, the heat accumulated by the thick layer of slag during the melting process is yielded to the scrap during the subsequent melting cycle, which saves energy and speeds up the melting times.

Furthermore, the accumulation of heat ensured by the layer of slag reduces the heat shock during the cooling steps of the furnace and/or when the roof is opened, and therefore minimises the thermo-mechanical stresses on the metallic tubes.

According to the invention, at least the inner layer is supplied with cooling liquid independently of the other two layers so that, even in the event of a breakage or accident, the inner layer can continue to carry out its function as an anchorage element for the slag, in order to form an insulating and protective layer for the outer layers.

In this case, there is the added advantage that the inner layer, that is to say, the one most subject to breakages during use, can be excluded without needing to close down the furnace.

According to a variant, the three layers are all supplied independently of each other.

The configuration of the panels according to the invention also facilitates maintenance; this is because the inner layer which, since it is exposed to the working area of the furnace, is most in need of restoration operations and possibly the replacement of worn parts, has wide spaces between the tubes which facilitate and assist such operations.

The tubes of at least the inner layer are equipped, according to a variant, with elements to attach the slag, such as for example metallic hooks, or cooled rings, made of material with a high thermal conductivity.

The layers may also be connected to each other by means of attachment, connection and reciprocal positioning hooks, possibly made with two metals so as to increase both thermal and mechanical resistance.

According to a variant, the connection hooks are cooled internally by a circulating cooling liquid.

According to the invention, the tubes used are of the unwelded type, for example obtained by hot bending, which considerably reduces the critical points which are most subject to thermal stress, and therefore considerably increases the working life of the panels.

The tubes of the panels may be of a non-circular section, according to a variant, in order to optimise the coefficient of heat exchange by adjusting the speed of the water and reducing the overall rate of flow by making water circulate only in the part of the tube exposed to the thermal flow.

According to this variant, it is possible to insert one tube inside another tube, or to give the tubes a half-moon shaped section, or other shaped sections.

The part of the tube where there is no water circulating may be filled with an appropriate material or fluid, or may be left empty.

According to a variant, the roof of the furnace is also cooled with a device with at least three layers of cooling tubes where the layers facing towards the inside of the furnace have a progressively greater pitch so as to define progressively larger spaces wherein the slag, powders or otherwise may become attached and consolidated.

According to the invention, the pitch of the layers may be constant for the entire diameter of the furnace, or may be variable in order to adjust the capacity to remove the thermal flow according to where the hotter or cooler areas of the furnace are.

According to a further variant, at least in the innermost layer the water is made to flow under inspiration and not under pressure, so that it is easy to stop the flow of water and minimise leakages in the event of a break in the tubes.

According to a variant, in cooperation with the shoulders of the lower shell there is at least a panel with cooling tubes arranged sloping downwards as they go towards the outside of the furnace.

These tubes are inserted into the refractory material of the lower shell and extend for a certain segment inside the working area of the furnace at a desired height with respect to the upper level of the liquid metal.

This protruding part of the cooling tubes causes an extension to the cooled area which affects the entire upper edge of the lower shell made of refractory material, with a consequent thermal protection of the zone which is most subject to stress and wear due to the high temperatures and the chemical reactions which occur there.

According to the invention, before the first melting cycle is started, the protruding part of the tubes is sprayed with refractory material which creates a protective covering layer which mechanically protects and thermally insulates that part of the tubes which protrudes inside the furnace.

The fact that the tubes slope downwards and towards the outside of the furnace facilitates the drainage of water, in the event of the tubes breaking; the water therefore flows to a zone which is not dangerous, and is prevented from coming into contact with the molten metal, and therefore any possible risk of explosion is avoided.

With this configuration, which includes three layers of cooling tubes, it is possible to obtain, compared with a single or double layer structure, as much as 15÷20% less energy loss.

BRIEF DESCRIPTION OF THE DRAWINGS

The attached figures are given as a non-restrictive example and show some preferred embodiments of the invention as follows.

DETAILED DESCRIPTION OF THE PREFERRED EMBODIMENTS

Figure 1:
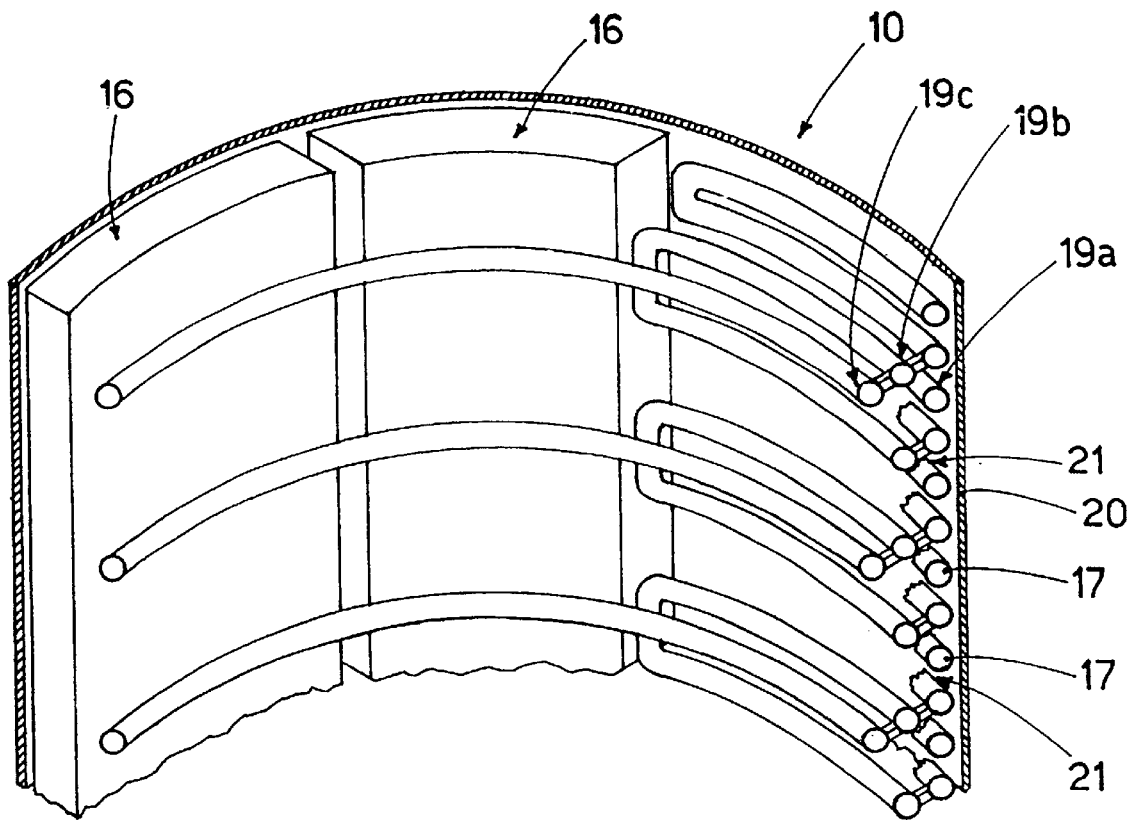
FIG. 1 shows in diagram form a section plane of a furnace equipped with a cooling device according to the invention.
Figure 2:
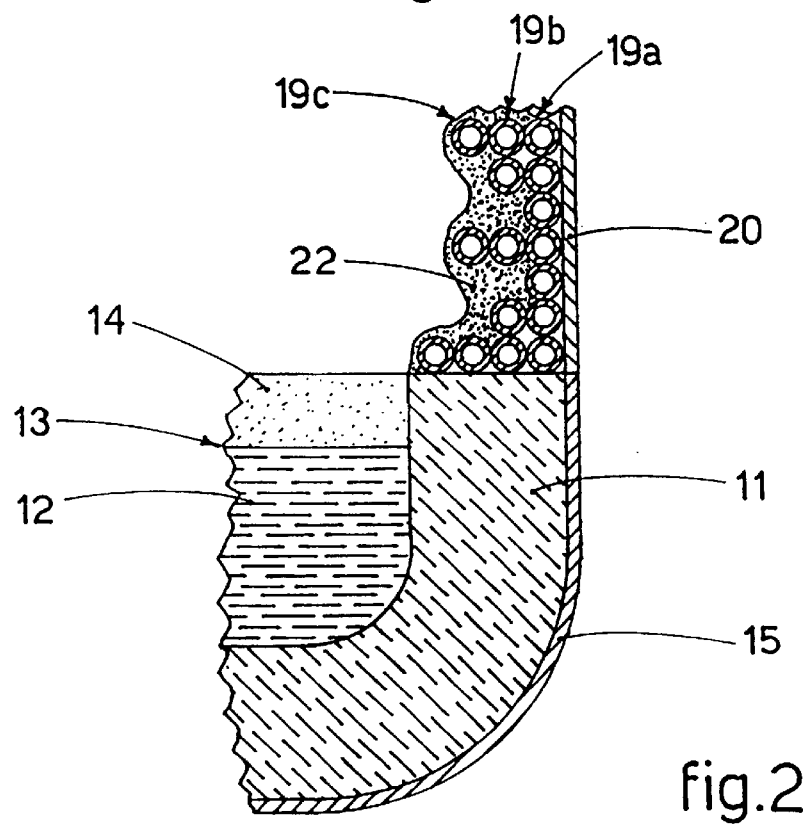
FIG. 2 is a part view of the lower part of a furnace equipped with the cooling device as shown in FIG. 1.

The electric furnace partly shown in the attached FIGS. comprises a lower shell 11 made of a refractory material and acting as a container for the bath of melting metal 12.

The bath of melting metal 12 has an upper level 13 above which there is a layer of slag 14.

The lower shell 11 cooperates on its outer part with a containing and supporting element 15 made of metal.

Above the lower shell 11, the furnace comprises an upper shell defined by a plurality of cooling panels 16 comprising adjacent tubes 17 inside which the cooling liquid circulates.

This plurality of cooling panels 16, which rise substantially vertically above the lower shell 11, constitute the cooling device 10.

The circular upper shell is covered at the top by a roof 18 associated with a relative cooling device 10 with panels 16.

The cooling device 10 according to the invention also comprises a panel, or portion of a panel 16, consisting of layers of tubes 17 located one in front of the other from the outside to the inside of the furnace; in this case, there is an outer layer 19a, an intermediate layer 19b and an inner layer 19c.

In the Figures, the tubes 17 are arranged substantially horizontally so as to follow the conformation of the walls of the furnace. In a variant which is not shown here the tubes 17 are substantially vertical.

The outer layer 19a cooperates on the outer part with a metallic wall 20 acting as a supporting and containing element.

In the outer layer 19a the tubes 17 are near each other so as to define a substantially continuous wall although there are fissures 21 between one tube 17 and the next. The fissures 21 increase the resistance of the tubes 17 to the thermo-mechanical stresses which occur during the working cycle.

In the intermediate layer 19b the tubes 17 are farther apart so that, in this case, for each row of the intermediate layer 19b there are two rows of the outer layer 19a. In the inner layer 19c the tubes are even farther apart so that, in this case, for each row of the inner layer 19c there are two rows of the intermediate layer 19b.

The spaces between the cooling tubes 17 of the inner layer 19c facilitate the formation of a thick layer of slag 22 which, as it becomes attached to the tubes 17, covers them and protects them from wear. This thick layer of slag 22 which forms between the tubes 17 of the inner layer 19c also functions as a heat accumulator, since it accumulates heat which it then gives up to the scrap at the start of a new melting cycle.

Moreover, the layer of slag 22 insulates and protects the intermediate layer 19b and the outer layer 19a both from thermo-mechanical stresses caused by the extremely high temperatures and also from the chemical reactions which occur inside the furnace, particularly in the area immediately above the layer of slag 14.

According to variants which are not shown here, all or part of the inner layer 19c is sloping with respect to the other two layers 19a, 19b.

Figure 3:
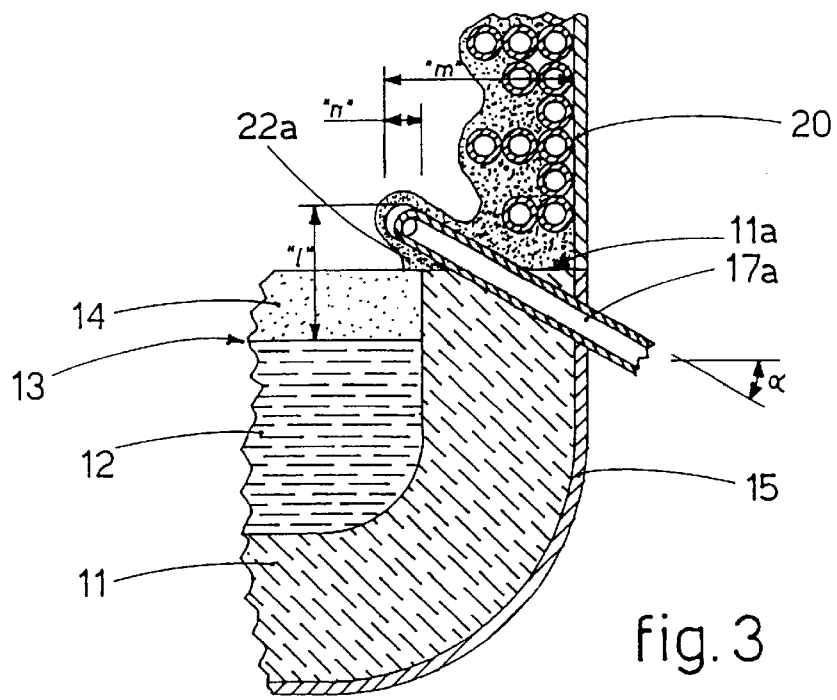
FIG. 3 shows a variant of FIG. 2.

In order to guarantee a more efficacious action to cool and protect the upper edge or shoulder 11a of the refractory lower shell, FIG. 3 shows a panel with tubes 17a sloping downwards and outwards and protruding for a certain segment inside the area of the furnace above the liquid bath 12.

The end of the cooling tubes 17a protrudes inside the area of the furnace to a value of "m", from the outer wall 20, by about 450÷600 mm, with a distance "n" from the inner edge of the lower shell 11 of about 100÷150 mm.

The height "l" of the end of the cooling tube 17a with respect to the upper level of the liquid bath 12 has a value of about 400÷500 mm.

The cooling tubes 17a, sloping and protruding towards the inside of the working area of the furnace, allow a layer of slag 22a to form which covers the shoulder 11a of the lower shell 11 in the zone where there is the greatest risk of wear and where the thermo-mechanical stresses are highest due to the high temperatures and the chemical reactions.

In order to further intensify this protective action, according to the invention at the beginning of the cycle the protruding part of the tubes 17a is sprayed with refractory material so that the refractory, cooling down as it comes into contact with the tubes 17a, solidifies and creates a protective and insulating layer which is then incorporated into the slag 22a which is progressively deposited during the melting cycle onto the tubes 17a.

Thanks to the sloping inclination outwards of the tubes 17a, in the event of a breakage the water is discharged far from the furnace. Moreover, to farther facilitate the discharge of the water, the water is supplied to the tubes 17, 17a by suction and not under pressure.

Due to the fact that the tubes 17 in the inner layer 19c are separated from each other by a greater distance, the loss of energy is less owing to the lower density of the tubes 17 in the area which is most exposed to heat exchange.

The inner layer 19c, according to the invention, is supplied with water independently of the other two layers 19a and 19b so that, even in the event of a breakage, it can continue to carry out its function of forming the layer of protective and insulating slag, and the furnace can continue to function.

Figure 6A:
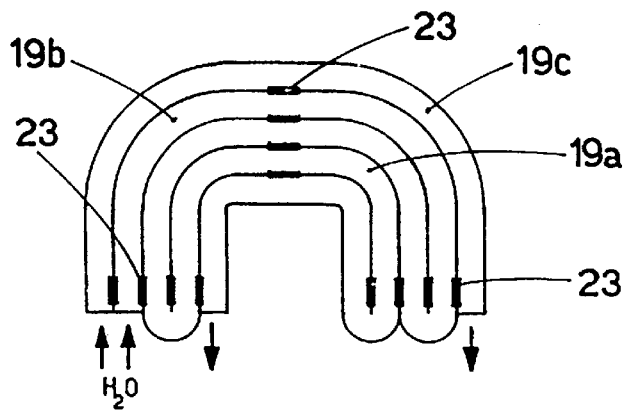
FIGS. 6a and 6b show in diagram form two configurations of the water supply to the tubes.
Figure 6B:
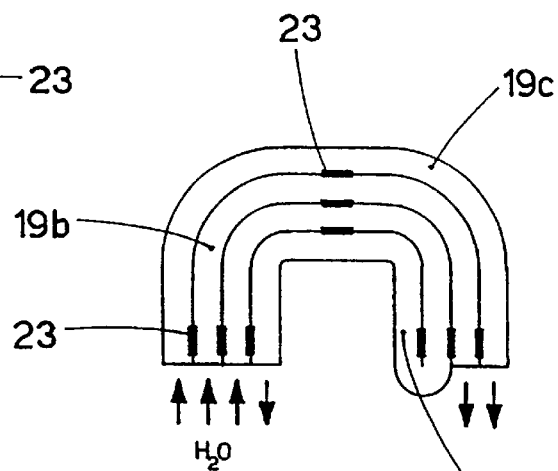

Two possible solutions for supplying the cooling liquid to the layers are shown in diagram form in FIGS. 6a and 6b.

In FIG. 6a, the inner layer 19c is supplied independently while the other two layers 19a and 19b are supplied in series; in FIG. 6b the three layers 19a, 19b and 19c are all supplied independently.

The layers 19a, 19b and 19c are connected to each other by means of hooks 23 for example made of hollow tubes so as to allow the cooling liquid to circulate; they are not shown in detail here.

Figure 7A:
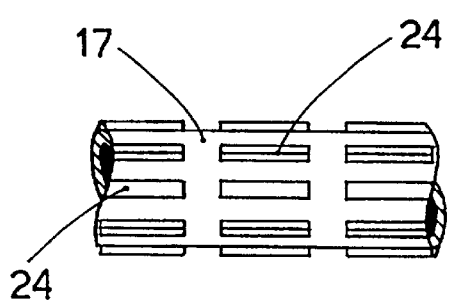
FIGS. 7a–7d show possible solutions to achieve the hooks to attach slag on the profile of the tubes.
Figure 7B:
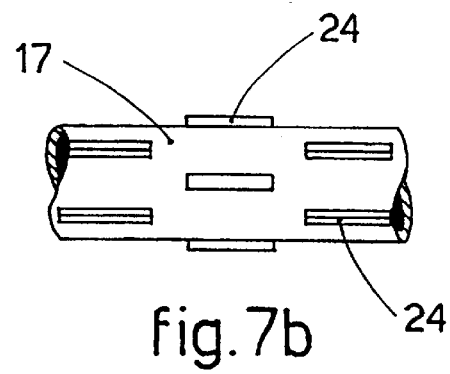

On their surface the tubes 17 have means which facilitate and consolidate the attachment of the slag 22. These means may consist of parallelepiped protrusions 24 distributed on the periphery of the tube 17 and arranged in alignment (FIG. 7a) or like a chess board (FIG. 7b).

Figure 7C:
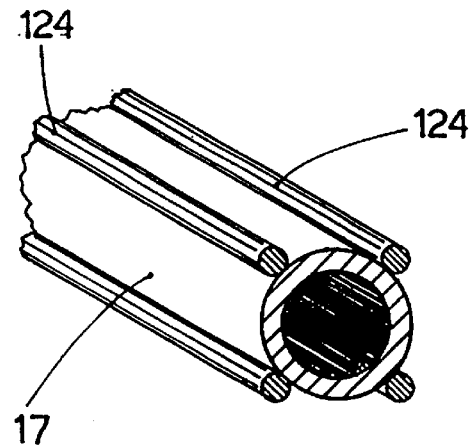
Figure 7D:
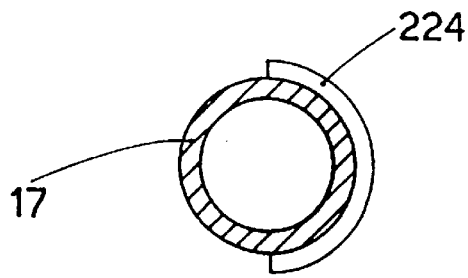

These means may also consist of longitudinal ridges 124 which run continuously along the whole length of the tube 17; they may be circular in section, as in FIG. 7c, square, hexagonal or any other desired section.

The means may consist of hooks 224 which extend in a transverse direction with respect to the relative tube 17.

The tubes 17 used, according to the invention, have no welds and may be of different shapes, not only circular; for example they may be oval or similar, or they may contain filling means inside which limit the area of transit of the cooling liquid, and concentrate it in the front area which faces the inside of the furnace.

Figure 4:
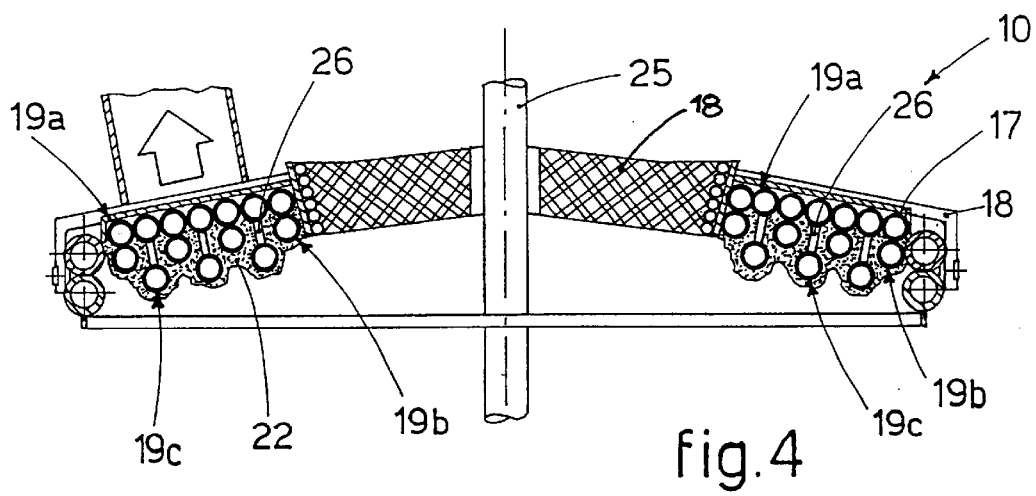
FIG. 4 shows a section of the roof of a furnace equipped with a cooling device according to the invention.
Figure 5:
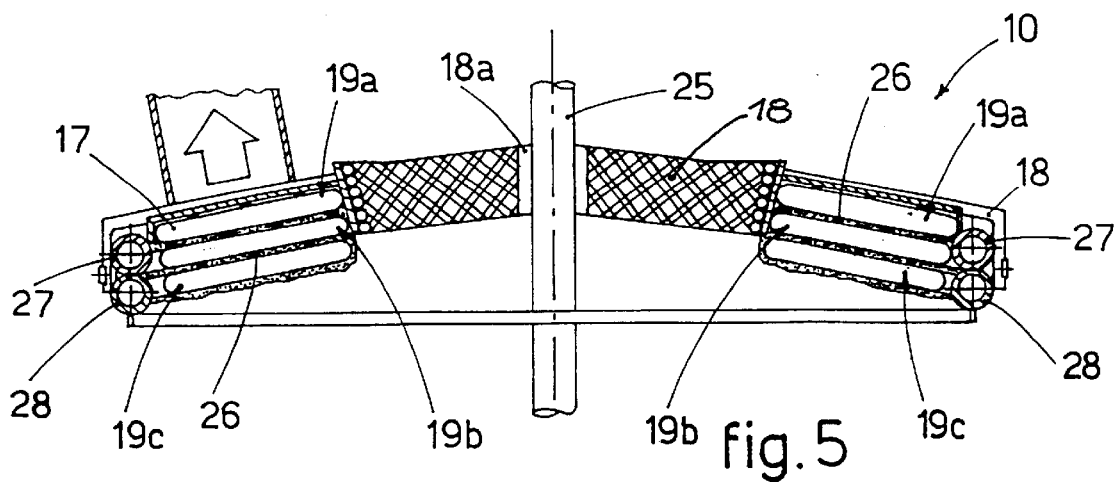
FIG. 5 shows a variant of FIG. 4.

In FIGS. 4 and 5 the device 10 is applied to the roof 18 of the furnace which has a hole 18a substantially at the centre, through which the electrode 25 is inserted.

The device 10 includes, as above, an outer layer 19a, an intermediate layer 19b and an inner layer 19c facing the working area of the furnace.

The tubes 17 of the layers 19a, 19b and 19c may be arranged along concentric circumferences with respect to the roof 18 (FIG. 4), or radially (FIG. 5). In FIGS. 4 and 5 it is possible to see the connecting hooks 26 by means of which the layers 19a, 19b and 19c are constrained together.

The tubes 17 are associated with manifolds 27, 28 for the inlet-outlet of the cooling liquid.

Here too, the spaces between the tubes 17 increase in size as they go towards the inner part of the furnace in order to facilitate the attachment of the slag 22 so as to create a protective and insulating layer for the inner layers.

What is claimed is:

1. An electric arc furnace comprising:
    a lower shell (11) containing a bath of molten metal (12) and
    an overhead upper shell defined by a plurality of panels (16) comprising cooling tubes (17), the upper shell being covered by a roof (18),
    the lower shell (11) including a containing element (15) made of metal on an outer part, and internal refractory including an upper edge (11a) located approximately at the upper line of a layer of slag (14) present above the bath of molten metal (12),
    wherein each panel (16) comprises at least three layers of cooling tubes, said three layers comprising, respectively, an outer layer (19a), an intermediate layer (19b) and an inner layer (19c), the layers of cooling tubes developing vertically along a vertical sidewall of said overhead upper shell above the refractory edge (11a) of the lower shell (11), the vertical distance between the cooling tubes (17) of said intermediate layer (19b) is greater than the vertical distance between the cooling tubes (17) of said outer layer (19a) and the vertical distance between the cooling tubes (17) of said inner layer (19c) is greater than the vertical distance between the cooling tubes (17) of said intermediate layer (19b) to define fissures and spaces of a progressively increasing size from the outside of the furnace towards the inside thereof whereon the slag attaches itself.

2. The electric arc furnace as in claim 1, wherein in cooperation with the upper edge (11a) of the lower shell (11), there is a panel of cooling tubes (17a) cooperating with the upper level of the slag (14).

3. The electric arc furnace as in claim 1, wherein distance between the tubes (17) of each of the outer layer (19a), intermediate layer (19b) and at least one inner layer (19c) associated with the roof (18) of the furnace, is progressively greater from the outside of the furnace towards the inside.

4. The electric arc furnace as in claim 2, wherein the cooling tubes (17a) cooperating with the upper edge (11a) of the lower shell (11) slope downwards and towards the outside of the furnace.

5. The electric arc furnace as in claim 4, wherein a front end of the tubes (17a) protrudes towards the inside of the furnace for a distance of at least 100 mm with respect to the inner edge of the lower shell (11).

6. The electric arc furnace as in claim 4, wherein a front end of the tubes (17a) is arranged at a height of at least 400 mm with respect to the upper level of the bath of melting metal (12).

7. The electric arc furnace as in claim 1, wherein a portion of the tubes (17a) protrudes inside the working area of the furnace and is covered by refractory material sprayed at the start of the melting cycle.

8. The electric arc furnace as in claim 1, wherein for each row of tubes (17) of the inner layer (19c) there are two rows of tubes (17) of the intermediate layer (19b).

9. The electric arc furnace as in claim 1, wherein for each row of tubes (17) of the intermediate layer (19b) there are two rows of tubes (17) of the outer layer (19a).

10. The electric arc furnace as in claim 1, wherein the cooling tubes (17) of the outer layer (19a) are in close proximity to each other and separated from each other by fissures (21).

11. The electric arc furnace as in claim 1, wherein the outer layer (19a) is covered on the outside by a metallic wall (20).

12. The electric arc furnace as in claim 1, wherein the inner layer (19c) is at least partly sloping with respect to the intermediate layer (19b) and outer layer (19a).

13. The electric arc furnace as in claim 1, wherein at least the inner layer (19c) is supplied with cooling liquid independently of the other two layers (19a, 19b).

14. The electric arc furnace as in claim 1, wherein the intermediate layer (19b) and the outer layer (19a) are supplied with cooling liquid in series.

15. The electric arc furnace as in claim 1, wherein at least the tubes (17a) cooperating with the upper edge (11a) of the lower shell (11) are supplied with cooling liquid by suction.

16. The electric arc furnace as in claim 1, wherein the layers (19a, 19b, 19c) are connected to each other by metallic hooks (26).

17. The electric arc furnace as in claim 1, wherein at least the tubes (17) of the inner layer (19c) have surface means to attach the slag distributed lengthwise in a discontinuous manner (24), lengthwise in a continuous manner (124) or transversely (224).

18. The electric arc furnace as in claim 1, wherein the tubes (17) at least of the inner layer (19c) are obtained from a hot-bent continuous tube.

19. The electric arc furnace as in claim 5, wherein the portion of the tubes (17a) protruding inside the working area of the furnace is covered by refractory material sprayed at the start of the melting cycle.

* * * * *

UNITED STATES PATENT AND TRADEMARK OFFICE
CERTIFICATE OF CORRECTION

| | |
|---|---|
| PATENT NO. | : 6,249,538 B1 |
| DATED | : June 19, 2001 |
| INVENTOR(S) | : Milorad Pavlicevic et al. |

It is certified that error appears in the above-identified patent and that said Letters Patent is hereby corrected as shown below:

<u>Title page,</u>
Item [73], should read as follows:
-- Assignee: DANIELI & C. OFFICINE MECCANICHE SpA. --

Signed and Sealed this

Twelfth Day of March, 2002

*Attest:*

JAMES E. ROGAN
*Attesting Officer*  *Director of the United States Patent and Trademark Office*